United States Patent [19]

Wohlkönig et al.

[11] Patent Number: 4,763,337
[45] Date of Patent: Aug. 9, 1988

[54] PROCESS FOR MELTING PARTICULATE MATERIAL

[75] Inventors: Hansjörg Wohlkönig, Salzburg; Heinz Müller, Neuhofen; Heinrich Auberger, Linz, all of Austria

[73] Assignee: Voest-Alpine Aktiengesellschaft, Linz, Austria

[21] Appl. No.: 106,547

[22] Filed: Oct. 6, 1987

[51] Int. Cl.[4] .............................................. F27D 3/00
[52] U.S. Cl. ......................................... 373/86; 373/81
[58] Field of Search ...................... 373/85, 86, 87, 81, 373/79, 18, 22; 414/147

[56] References Cited

U.S. PATENT DOCUMENTS

| | | | |
|---|---|---|---|
| 1,254,079 | 1/1918 | Snyder | 373/81 |
| 3,895,175 | 7/1975 | Krogsrud | 373/86 |
| 3,975,575 | 8/1976 | Krogsrud | 373/86 |
| 3,975,576 | 8/1976 | Krogsrud | 373/86 |
| 4,005,252 | 1/1977 | Krogsrud | 373/86 |

FOREIGN PATENT DOCUMENTS

| | | |
|---|---|---|
| 0071351 | 2/1983 | European Pat. Off. . |
| 3419575 | 6/1984 | Fed. Rep. of Germany . |

Primary Examiner—Roy N. Envall, Jr.
Attorney, Agent, or Firm—Hopgood, Calimafde, Kalil, Blaustein & Judlowe

[57] ABSTRACT

In order to melt particulate material in an electric furnace with the help of at least one electric arc burning between a burner electrode arranged in the lid of the furnace and a bottom electrode arranged in the bottom of the furnace, the material is introduced into a space surrounding the electric arc. It is melted by the radiation heat of the electric arc and is collected in a melt bath covering the bottom part of the furnace. In order to attain a high energy exploitation and to prevent the material to be melted from being extracted, a fixed bed of the material to be melted is formed in the space surrounding the electric arc, which takes its root on the bottom part of the furnace and peripherally surrounds the electric arc. The material is melted on the side of the fixed bed facing the electric arc. The fixed bed is moved approximately radially towards the center of the furnace to an extent corresponding to the melted material volume. The material to be melted is charged between the fixed bed and a shell externally surrounding the fixed bed.

10 Claims, 2 Drawing Sheets

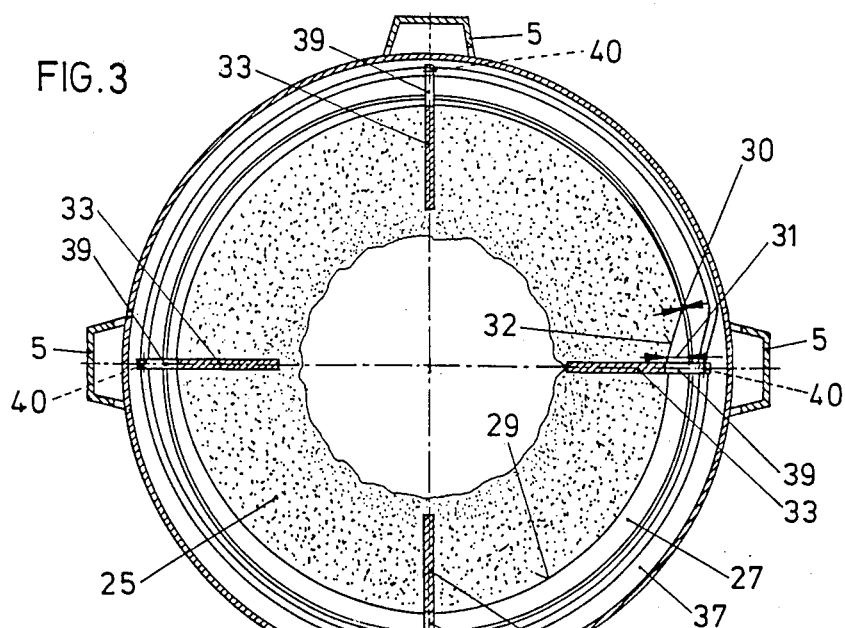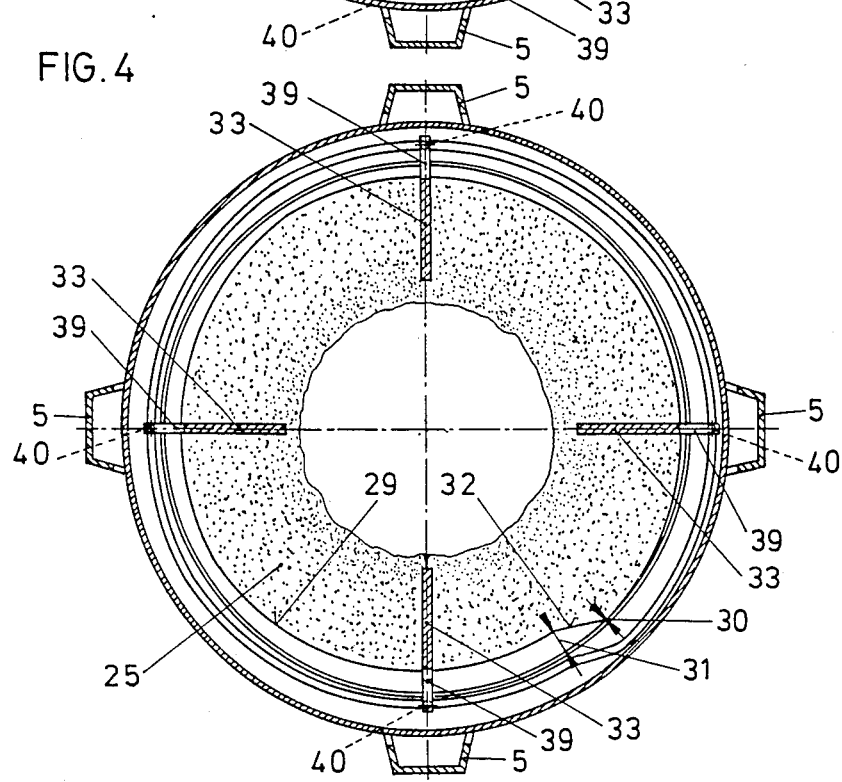

PROCESS FOR MELTING PARTICULATE MATERIAL

The invention relates to a process for melting particulate material, in particular metal or metal-oxide containing dusts, in an electric furnace, such as a plasma furnace, with the help of at least one electric arc burning between a burner electrode arranged in the lid of the furnace and a bottom electrode arranged in the bottom part of the furnace, wherein the particulate material to be melted is introduced into a space surrounding the electric arc, is melted by the radiation heat of the electric arc, and is collected in a melt bath covering the bottom part of the furnace, as well as to a melting furnace for carrying out the process.

When charging a melting furnace with particulate material, such as dusts, via openings provided in its lid or side wall, as is known, e.g., from DE-A -34 19 575, it is unavoidable that part of the dust is carried away with the exhaust gas flow. This is the case, in particular, with melting reduction processes as a result of the large amounts of exhaust gas forming and leads an increase in the specific energy consumption.

To avoid these disadvantages, it is known from EP-A 0 071 351, with a process of the initially defined kind, to blow the particulate material tangentially into a cooled verticallly disposed sleeve surrounding a directly burning plasma jet. Due to the radiation heat of the plasma arc formed between the plasma burner and the melt bath, the particulate material fed melts, runs off as a film along the cooled sleeve, and finally drops into the melt bath. This process has the disadvantage that a major portion of energy occurs as a cooling loss, since the molten film flowing down the cooled sleeve hardly exhibits any heat-insulating effect.

With the process known from DE-A - 34 19 575 a loss of energy in the melting zone is prevented, though; yet the energy yield, on account of the indirectly burning plasma burner provided there, is in a poor ratio relative to the electric energy put into the plasma burner, because large cooling water losses occur within the plasma burner.

The invention has as its object to provide a process as well as a melting furnace for carrying out the process, by which it is possible to melt particulate material, in particular iron and iron-oxide containing dusts from filter plants of steelworks and other metallurgical plants, and to reduce the same, if necessary, wherein a high exploitation of energy is attained and discharging of the particulate material is prevented.

With a process of the initially defined kind, this object is achieved in that, in the space surrounding the electric arc, a fixed bed of the material to be melted is formed, which takes its root on the bottom part of the furnace or in the melt bath and peripherally surrounds the electric arc, and on whose side facing the electric arc the material is melted, that the fixed bed is moved towards the furnace center approximately radially to the extent of the melted material volume, and that material to be melted is fed between the fixed bed and a shell externally surrounding the fixed bed.

A melting furnace for carrying out the process, which has a tub-shaped bottom part equipped with at least one bottom electrode, a furnace central part following thereupon, and a lid equipped with at least one burner electrode and covering the furnace central part, is characterized in that the furnace central part is rotatably mounted relative to the bottom part and that its surface facing the interior comprises at least one projection inwardly projecting in the radial direction and wedgedly shaped in the circumferential direction.

According to a preferred embodiment, the projection has a spiral-shaped internal surface in the circumferential direction of the furnace central part, the spiral-shaped internal surface of the projection advantageously extending over almost the entire internal circumference of the furnace central part and an oblique face being provided between the radial minimum and the radial maximum of the projection so as to extend only over a slight circumferential portion of the furnace central part.

In order to prevent co-rotation of the fixed bed with the rotating furnace central part, radially and vertically directed plates suitably are provided between the bottom part and the lid, which extend approximately over the height and thickness of the fixed bed and are immovably supported in the circumferential direction on the bottom part and/or on the lid.

Advantageously, the radially directed plates are movable in the radial direction in accordance with the internal surface of the projection by means of a guiding device arranged at the furnace central part, whereby the sintered boundary layer forming on the inner side of the fixed bed periodically is torn up such that too dense a sintering of this bordery layer is avoided and the radial material flux in the direction towards the furnace center is maintained.

According to a preferred embodiment, the guiding device is formed by a groove or tongue each cooperating with a dog arranged on the radially directed plate, the groove or tongue being arranged on the furnace central part so as to extend equidistantly relative to the internal surface of the projection, and radially outside of the same.

To charge the particulate material, an annular gap advantageously is provided between the furnace central part and the lid, towards which at least one supplying means feeding the particulate material is directed and whose size preferably corresponds to approximately the difference of the radial minimum from the radial maximum of the projection.

In order to do with just one supplying means, the latter suitably is rotatable synchronously with the furnace central part.

The invention will now be explained in more detail by way of one embodiment illustrated in the drawings, wherein:

FIGS. 3 and 4 are sectioned illustrations along line III—III of FIG. 1, of the furnace central part turned into different positions during the melting operation.

Figure 1:
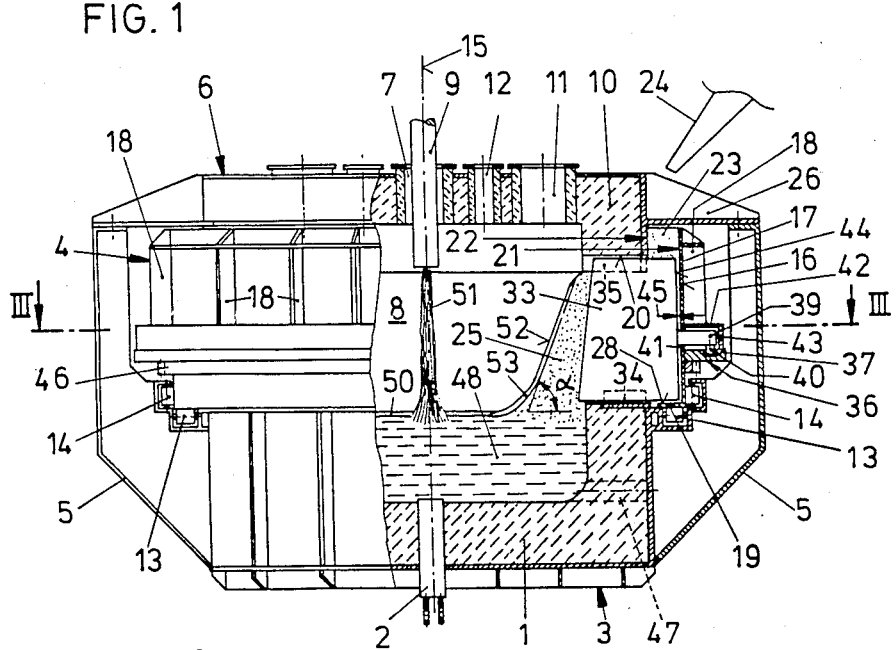
FIG. 1 is a partially sectioned side view of a melting furnace according to the invention.

The melting furnace illustrated in the Figures is a plasma melting furnace substantially comprised of three main parts: a tub-shaped bottom part 3 provided with a refractory lining 1 and equipped with at least one bottom electrode 2, an approximately cylindrical furnace central part 4 rotatably mounted on the bottom part 3 and extending vertically upwards, and a lid 6 supported on the bottom part 3 via console 5 laterally projecting beyond the rotatable furnace central part 4, which lid is equipped with at least one burner electrode 9 reaching into the furnace interior 8 through an opening 7. Furthermore, the lid 6, which is provided with a refractory lining 10, includes openings 11 to draw off the furnace exhaust gas and, optionally, openings 12 to feed a reducant, e.g., carbon. These openings surround the centrally arranged burner electrode 9 designed as a plasma burner.

The rotatable furnace central part 4 is mounted on the bottom part 3 by means of several rollers 13, 14 uniformly distributed along the circumference of the bottom part 3, the rollers 13 with their axles arranged radially towards the furnace center or furnace axis 15 absorbing the weight of the rotatable furnace central part 4, and the rollers 14 with their axles arranged vertical being mounted on the bottom part, centering the rotatable furnace central part 4 with respect to the bottom part 3.

The rotatable furnace central part 4 is formed by a shell 17, which is circular-cylindrically shaped on its outer side 16 and is reinforced by ribs 18 vertically arranged on the outer side. On the lower end, the furnace central part 4 is provided with a horizontal flange 19 directed radially inwards, which rests on the horizontally arranged rollers 13 and projects towards the periphery of the bottom part 3. The shell 17 rises beyond the lower edge 20 of the lid 6 by a slight extent, its internal diameter 21 being larger than the external diameter 22 of the lid, an upwardly open annular gap 23, thus, being formed between the lid 6 and the shell 17 of the furnace central part 4. A supplying means designed as a supply pipe 24 for the particulate material 25 to be charged is directed towards this annular gap 23. This annular gap 23 is bridged only partially by lugs 26 arranged on the lid 6 and projecting outwards, by which the lid 6 rests on the consoles 5.

On the inner side of the furnace central part 4, a radially inwardly directed projection 27 is provided, as is apparent particularly from FIGS. 3 and 4, which projection, in terms of height, extends from the upper edge 28 of the flange 19 to the lower edge 20 of the lid. Over the internal surface 29 of the rotatable furnace central part 4, the projection 27 is spiral-spaped - seen from above -, extending between its radial minimum 30 and its radial maximum 31 over almost the entire circumference of the furnace central part 4. Between the radial minimum 30 and the radial maximum 31, an oblique face 32 is provided, which connects these points and extends over only a slight circumferential portion of the furnace central part 4.

Between the bottom part 3 and the lid 6, radially and vertically directed plates 33 uniformly distributed over the circumference of the interior 8 are inserted, which are each displaceably mounted, with their lower end in a radially directed guide 34 arranged on the bottom part 3 and with their upper end in a radially directed guide 35 arranged on the lid 6. As is apparent from FIGS. 3 and 4, four plates 33 are provided, which are uniformly distributedly arranged in the circumferential direction.

A guiding means 36 arranged on the rotatable furnace central part 4 serves to radially displace these plates 33, which guiding means is constituted by a rail 37 cantilevering radially outwards, and in which a circumferential groove 38 formed equidistantly to the internal surface 29 of the projection 27 is provided. Dogs 40 arranged on radially outwardly directed projections 30 of the plates 33 reach into this groove 38. In order to allow for the passage of the projections 39 through the shell 17 of the furnace central part 4 rotating with respect to the projections 39, the shell 17 and, commonly therewith, the projection 27 are divided into two parts in terms of height, a gap 41 being provided between these two parts, which corresponds to the height of the projections 39. The connection of the two parts of the shell 17 is realized by means of a radially directed flange 42 arranged on the upper part of the shell 17, upon which a vertically downwardly directed shell part 43 follows, which, in turn, is rigidly connected to the rail 37. The length of the projections 39 of the plates 33 is designed such that the radially external edge 44 of each plate 33 comes to lie at a slight distance 45 from the internal surface 29 of the projection 27 so that friction at the non-rotatable plates 33 will be prevented as the furnace central part 4 rotates.

To rotate the furnace central part 4, the latter comprises a gear rim 46 disposed on its outer side, in which a pinion (not illustrated) of a driving motor engages.

Figure 2:
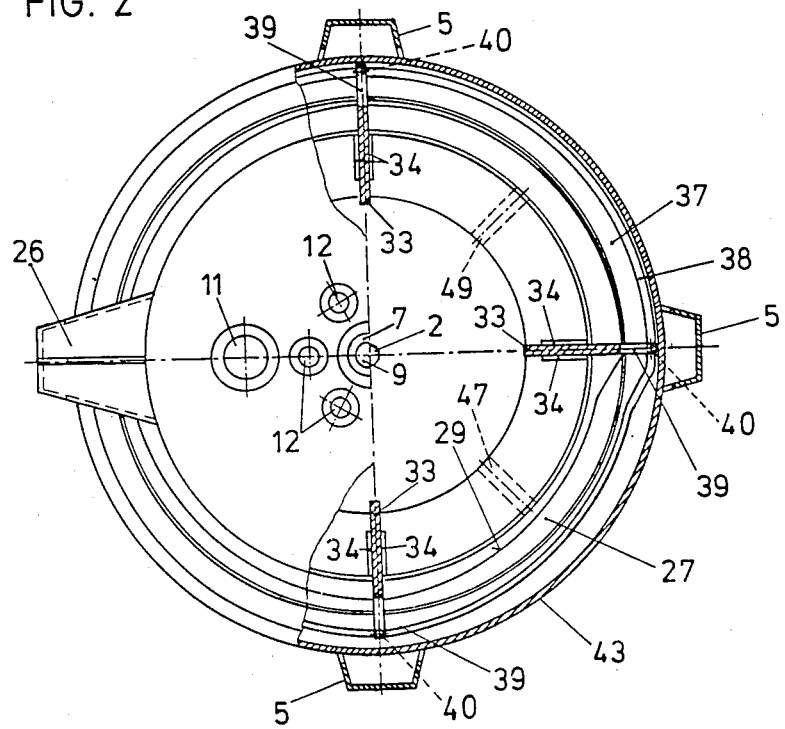
FIG. 2 is a partially sectioned top view on the emptied melting furnace.

The bottom part 3 includes a tap opening 47 for the melt 48 and a further tap opening 49 for the slag 50, which are schematically illustrated in FIG. 2.

When melting particulate material, the melting furnace functions as follows:

Upon charging of the melting furnace with the help of the supplying means 24 and ignition of the electric arc 51 between the burner electrode 9 and the bottom electrode 2, a fixed bed of material 25 to be melted forms in the furnace interior 8, which has its root in the melt 48 and its approximately conically designed surface 52 directed to the electric arc 51 or plasma jet, which surface is continuously melted off by the radially directed radiation heat of the plasma jet 51. In this manner a cavern forms, whose angle of inclination alpha, with loose piling, is steeper than the angle or repose of the material 25 to be melted.

Thus, a good bearing bordery layer 53 is formed on the surface 52 of the fixed bed between the liquid phase and the particulate material. This bordery layer, which has formed by sintering together of the material 25, has sufficient mechanical strength to prevent the cavern from collapsing.

By rotating the furnace central part 4, particulate material 25 is conveyed in the direction towards the furnace center 15 with the help of the spirally designed projection 27 to the extent at which the material 25 to be melted melts off on the inner side. In doing so, the plates 33, which are radially and vertically arranged between the bottom part 3 and the lid 6, prevent the fixed bed from co-rotating with the furnace central part. These plates 33, furthermore, cause a periodic breaking of the bordery layer 53 by the pressure exerted in the radial direction, as is illustrated in FIG. 3 with the plate 33 farthest inwardly displaced in the radial direction. Thereby, too dense a sintering of the bordery layer 53, which might disturb the radial material flux towards the interior, is effectively prevented.

The number of revolutions or circumferential speed of the furnace central part is chosen as a function of the amount of material melting off at the inner side, the rotation being effected in a manner that the spirally designed part of the internal surface 29 of the projection 27 presses the material 25 to be melted inwardly in the radial direction. The oblique face 32 connecting the radial maximum 31 with the radial minimum 30 of the projection 27, during the rotational movement, leads to a cavity forming behind it, into which new material 25 to be melted is fed with the helt of the supply means 24. To this end, the supply means 24 may be rotated synchronously with the furnace central part 4 such that the supply pipe 24 always comes to lie above the cavity forming and migrating with the rotation of the furnace central part 4.

With the help of the process according to the invention and the melting furnace of the invention, it is possible to melt and reduce metal-oxide containing dusts, such as, e.g., FeO-containing material from dedusting plants of oxygen blowing steelworks, electric steelworks, or fine grained iron ores, the reducing carbon required either being fed into the interior 8 via the charging openings 12 and/or being admixed to the material 25 to be melted and fed via the supply means 24. The reducing carbon, when being fed through openings 12, suitably has such a grain size that it will not be extracted by the plasma gas and the exhaust gas forming during reduction.

The process according to the invention, in addition to the high energy exploitation and the prevented extraction of the particulate material 25, has the advantage that the radiation heat of the electric arc 51 or of the plama jet, which, above all, incurs in the radial direction, is optimally utilized, and that no refractory furnace lining is required for the furnace central part connecting the bottom part 3 with the lid 6. Part of the melting heat is applied through the sensible heat of the plasma gas diverted at the melt bath and brushing over the surface 52 of the fixed bed, moreover, sensible heat is transferred by the melt bath in the contacting zone melt-fixed bed.

The invention is not limited to the embodiment illustrated in the drawing, but may be modified in various aspects. Thus, it is possible to provide several projections on the inner side of the furnace central part 4 instead of the single projection 27. Also, it is not absolutely necessary to provide the projection with a spiral internal surface, seen from above; it is just to be taken care that the projection 27, when rotating the furnace central part 4, increases in the radial direction - seen from a stationary part of the furnace -, thus moving on the material 25 to be melted in the direction towards the furnace center 15 or towards the plasma jet 51.

In respect of the rotatable mounting of the furnace central part 4, various alternatives are feasible. Likewisely, instead of the sliding guides provided for the guides 34, 35 of the radially and vertically directed plates 33, as illustrated in the exemplary embodiment, other guides, e.g., those having roller bearings, may be provided to prevent the plates 33 from chafing at the bottom part 3 of the melting furnace.

Instead of the single supply means 24 shown in the embodiment illustrated, several ones may be provided above the annular gap 23, which are actuated one after the other in the sense of rotation of the furnace central part 4. The furnace central part 4 need not necssarily be designed cylindrical, but it may also have frustoconical shape.

The process according to the invention is advantageous not only with plasma melting furnaces, but even with melting furnaces operated by conventional electric arcs generated by means of carbon electrodes.

What we claim is:

1. In a process for melting particulate material, such as metal or metal-oxide containing dusts, in an electric furnace, such as a plamsa furnace, including a furnace bottom part with a bottom electrode, a furnace central part, and a furnace lid with a burner electrode, by at least one electric arc burning between said burner electrode and said bottom electroe, which process includes the steps of introducing particulate material to be melted into a space surrounding said electric arc, melting said particulate material by the radiation heat of said electric arc so as to obtain molten material, and collecting said molten material in a melt bath covering said furnace bottom part, the improvement comprising:

forming a fixed bed of said particulate material to be melted in the space surrounding said electric arc, said fixed bed having its roots on said furnace bottom part in said melt bath and peripherally surrounding said electric arc, and said material being melted on the side of said fixed bed facing said electric arc, moving said fixed bed approximately radially towards the center of said furnace to an extent corresponding to the volume of said molten material, and charging material to be melted between said fixed bed and a shell externally surrounding said fixed bed.

2. In a melting furnace to be used for melting particulate material by means of at least one electric arc so as to obtain a melt bath of molten material, and of the type including a tub-shaped furnace bottom part equipped with at least one bottom electrode, a furnace central part following upon said furnace bottom part and including a shell, and a furnace lid covering said furnace central part and equipped with at least one burner electrode, said furnace parts defining a furnace interior, and said at least one electric arc burning between said burner electrode and said bottom electrode, the improvement wherein said furnace central part is rotatably mounted with respect to said furnace bottom part and at least one projection is provided on its surface facing said furnace interior, said projection extending radially inwards and being wedge-shaped in the circumferential direction.

3. A melting furnace as set forth in claim 2, wherein said projection has a spiral-shaped internal surface in the circumferential direction of said furnace central part.

4. A melting furnace as set forth in claim 3, wherein said spiral-shaped internal surface of said projection extends over approximately the entire inner circumference of said furnace central part, and an oblique surface is provided on said projection between its radial minimum and its radial maximum and extending only over a slight circumferential portion of said furnace central part.

5. A melting furnace as set forth in claim 2, wherein a fixed bed of said particulate material to be melted is formed in the space surrounding said electric arc, which fixed bed has its root on said furnace bottom part and peripherally surrounds said electric arc, said material being melted on the side of said fixed bed facing said electric arc, and further comprising radially and vertically directed plates provided between said furnace bottom part and said furnace lid and extending approximately over the height and thickness of said fixed bed, said fixed bed being moved approximately radially towards the center of said furnace to an extent corresponding to the volume of said molten material and said plates being immovably supported in the circumferential direction on at least one of said furnace bottom part and said furnace lid.

6. A melting furnace as set forth in claim 5, wherein said projection has a spiral-shaped internal surface, and further comprising a guiding means arranged on said furnace central part and adapted to move said radially directed plates according to said spiral-shaped internal surface in the radial direction.

7. A melting furnace a set forth in claim 6, wherein said guiding means is formed by a groove or tongue provided on said furnace central part radially outside of said projection and to extend equidistantly to said internal surface of said projection, and wherein each of said radially directed plates has a dog to coact with said troove or tongue.

8. A melting furnace as set forth in claim 2, wherein an annular gap is provided between said furnace central part and said furnace lid, and further comprising at least one supply means directed towards said annular gap for feeding said particulate material.

9. A melting furnace as set forth in claim 8, wherein said annular gap has a size approximately corresponding to the difference of the radial minimum from the radial maximum of said projection.

10. A melting furnace as set forth in claim 8, wherein a single supply means is provided so as to be rotatable synchronously with said furnace central part.

* * * * *

UNITED STATES PATENT AND TRADEMARK OFFICE
CERTIFICATE OF CORRECTION

PATENT NO. : 4,763,337
DATED : August 9, 1988
INVENTOR(S) : Hansjorg Wolkonig et al It is certified that error appears in the above-identified patent and that said Letters Patent is hereby corrected as shown below:

The front page of U.S. Patent No. 4,763,337 should be amended to include the following:

-- [30] Foreign Application Data
October 30, 1986 (AT) Austria------2885/86 -- .

Signed and Sealed this

Fourteenth Day of February, 1989

Attest:

DONALD J. QUIGG

*Attesting Officer*  *Commissioner of Patents and Trademarks*